United States Patent [19]
Rabizadeh

[11] Patent Number: 5,503,012
[45] Date of Patent: Apr. 2, 1996

[54] TIRE PRESSURE MONITORING DEVICE

[76] Inventor: Masoud Rabizadeh, 23325 Saint Andrews, Mission Viejo, Calif. 92692

[21] Appl. No.: 441,729
[22] Filed: May 16, 1995
[51] Int. Cl.⁶ .................................................. B60C 23/02
[52] U.S. Cl. ............................................................ 73/146.8
[58] Field of Search ............................... 73/146.8, 146.5, 73/746, 753

[56]         References Cited
         U.S. PATENT DOCUMENTS

| D. 156,807 | 1/1950 | Battersby . | |
|---|---|---|---|
| 1,495,553 | 5/1924 | Durham . | |
| 3,720,224 | 3/1973 | Foxhall . | |
| 3,907,461 | 9/1975 | Bouder . | |
| 4,310,014 | 1/1982 | Parker . | |
| 4,411,302 | 10/1983 | Kuypers . | |
| 4,966,035 | 10/1990 | Huang . | |
| 5,025,244 | 6/1991 | Huang | 73/146.8 |
| 5,284,061 | 2/1994 | Seeley et al. | 73/746 |
| 5,307,846 | 5/1994 | Heinemann . | |

FOREIGN PATENT DOCUMENTS 925611   5/1963   United Kingdom .

Primary Examiner—Richard Chilcot
Assistant Examiner—William L. Oen
Attorney, Agent, or Firm—Richard C. Litman

[57]            ABSTRACT

A tire pressure monitoring device includes a ball disposed within a tube which has an opening, at one end, in communication with the interior of the tire. The tube has a transparent window along its length to allow the position of the ball, within the tube, to be visualized. The transparent window has graduations, calibrated to allow the tire pressure to be determined by the position of the ball within the tube. A magnifying glass can be provided over the transparent window to allow the graduations to be more easily seen. The device can be made integral with a tire valve stem or as an accessory item which can be connected to a conventional tire valve stem. The device continuously displays the tire pressure without causing air to be vented from the tire.

20 Claims, 5 Drawing Sheets

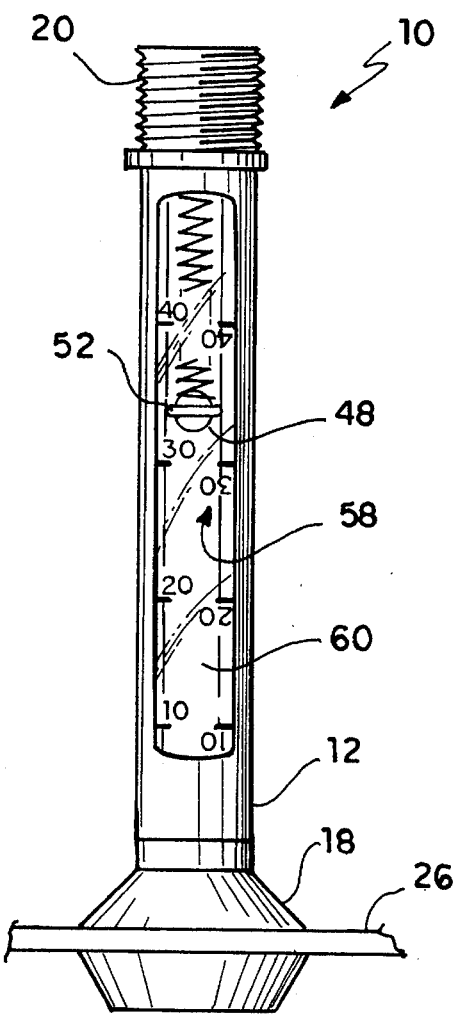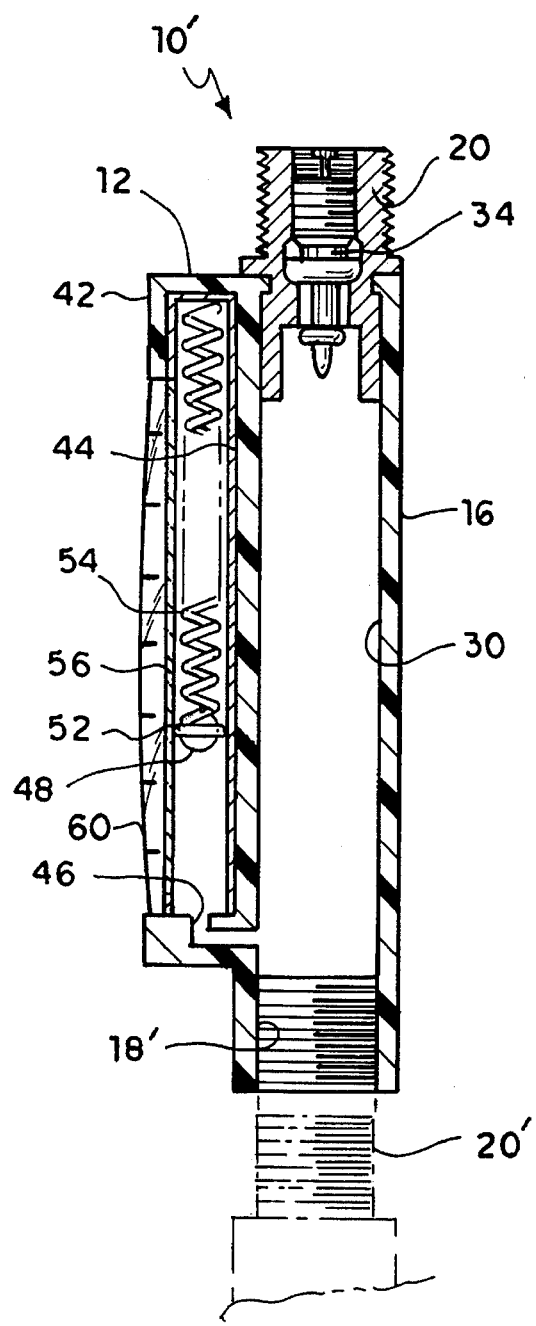
FIG. 2
FIG. 3

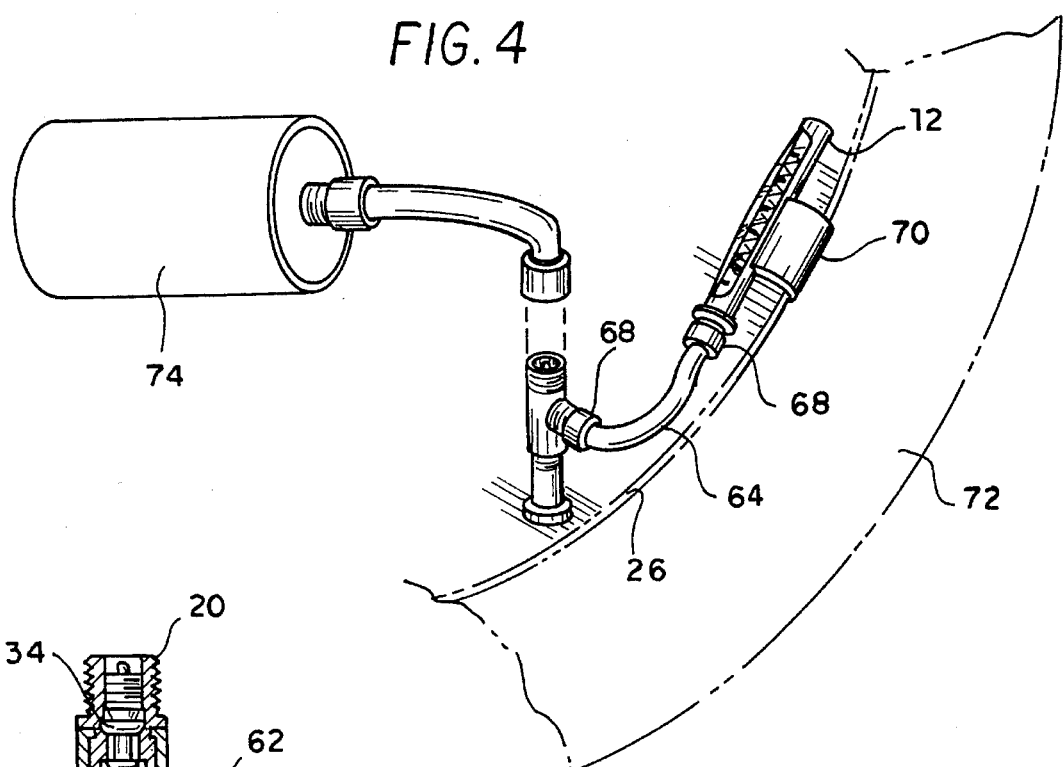
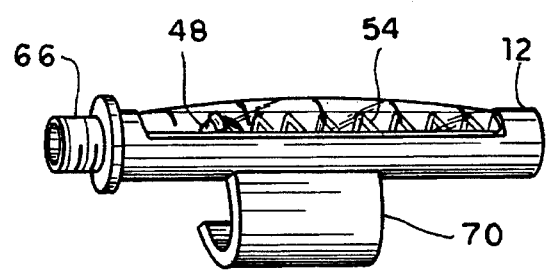
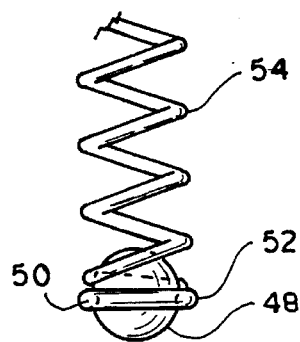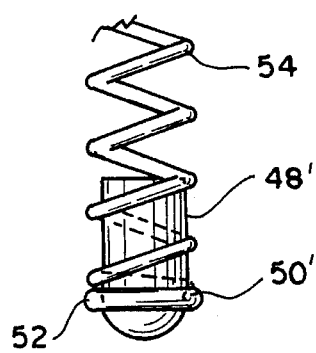

TIRE PRESSURE MONITORING DEVICE

BACKGROUND OF THE INVENTION

1. FIELD OF THE INVENTION

The present invention relates to a pressure gauge which is mounted to a vehicle's wheel and continuously displays the air pressure in the pneumatic tire forming part of the wheel.

2. DESCRIPTION OF THE PRIOR ART

When using the air hose at a service station, motorists often find that the pressure gauge incorporated into the air hose is inoperative and that they have forgotten to bring their pocket tire pressure gauge with them. In such situations, the motorist is left without a reliable means for ascertaining whether his or her tires are properly inflated, thus exposing the motorist to the potential hazards such as loss of control due to under inflation, tire blowout, poor fuel economy, and excessive tire wear associated with improperly inflated tires.

To remedy this problem tire gauges that permanently attach to the vehicle's wheels have been proposed in the prior art. However, none of the references cited below are seen to teach or suggest the pressure gauge of the present invention which remains on the vehicle's wheel during operation, and includes a pressure indicating member disposed in a tube having a transparent window and an opening in the tube which allows open fluid communication between the interior of the tire and the interior of the tube.

U.S. Pat. No. 1,495,553, issued to Durham, shows a tire gauge which is incorporated into the tire inflating apparatus. The Durham device does not display tire pressure, but rather shuts off air supply when the tire pressure reaches a preset level.

U.S. Pat. No. 3,720,224, issued to Foxhall, shows a valve stem cap having a tire gauge. The Foxhall device does not display pressure continuously and must be pressed in by the user to give a pressure reading.

U.S. Pat. No. 3,907,461, issued to Bouder, shows a hand air pump having a built in pressure gauge. Bouder does not show a gauge for continuously displaying tire pressure.

U.S. Pat. No. 4,310,014 issued to Parker, shows a valve stem with a built in pressure gauge. In the Parker device the bleeder valve is supported by an extensible sleeve which allows the bleeder valve to protrude farther away from the base of the valve stem when the tire pressure is increased.

U.S. Pat. No. 4,411,302, issued to Kuypers, shows one type of conventionally used valve stem.

U.S. Pat. No. 4,966,035, issued to Huang, shows a pocket type pressure gauge.

U.S. Pat. No. 5,307,846, issued to Heinemann, shows a device for equalizing the pressure in all four tires of a motor vehicle.

U.S. Pat. No. Des. 156,807, issued to Battersby, shows the ornamental design for a pocket type pressure gauge.

United Kingdom Patent Document Number 925,611, by Gfoell, shows a valve stem cap with an integral pressure gauge. The pressure gauge of Gfoell has a sliding member which protrudes above the open end of a tube to allow the tire pressure to be ascertained by a user.

None of the above inventions and patents, taken either singly or in combination, is seen to describe the instant invention as claimed.

SUMMARY OF THE INVENTION

The present invention is directed to a tire gauge for continuously displaying the tire pressure, which can be used as a valve stem replacement or as an attachment to an existing valve stem. The pressure gauge of the present invention includes a pressure indicating member disposed in a tube having a transparent window. The tube has an opening which allows open fluid communication between the interior of the tire and the interior of the tube.

Accordingly, it is a principal object of the invention to provide a tire pressure gauge attached to a wheel which continuously displays the tire pressure.

It is another object of the invention to provide a valve stem having an integral pressure gauge.

It is a further object of the invention to provide a tire pressure gauge for continuously displaying the tire pressure which attaches to a standard valve stem.

Still another object of the invention is to provide a tire pressure gauge having an electronic tire pressure display.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a side elevational view showing the indicia on the pressure gauge portion of the valve stem with integral pressure gauge of the present invention.

FIG. 3 is a cross sectional view showing the valve stem attachment with integral pressure gauge of the present invention.

FIG. 4 is an environmental view showing the valve stem attachment with separate pressure gauge of the present invention.

FIG. 5 is a cross sectional view of the valve stem attachment for use with the separate pressure gauge of the present invention.

FIG. 6 is a perspective detail view of the separate pressure gauge of the present invention.

FIG. 7A is a fragmentary detail view of the arrangement of the ball, O-ring, and spring used in the pressure gauge of the present invention.

FIG. 7B is a fragmentary detail view of the arrangement of the piston, O-ring, and spring used in the pressure gauge of the present invention.

Similar reference characters denote corresponding features consistently throughout the attached drawings.

DETAILED DESCRIPTION OF THE PREFERRED EMBODIMENTS

Figure 1:
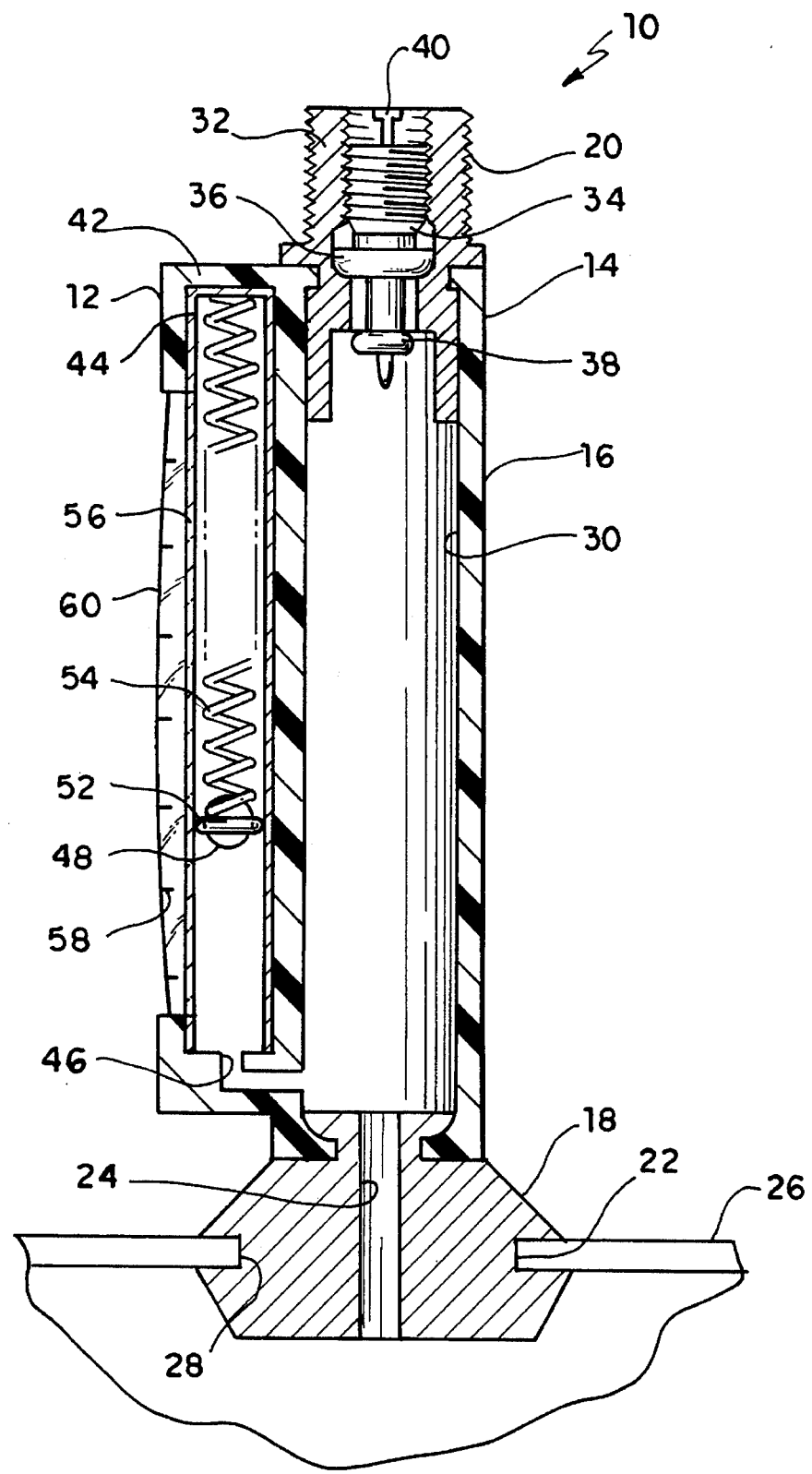
FIG. 1 is a cross sectional view showing the valve stem with integral pressure gauge of the present invention.

Referring to FIGS. 1, 2, and 7A a first embodiment of the present invention is seen. The embodiment of FIGS. 1 and 2 is designed to entirely replace the conventional valve stem currently used in automobile wheels. The pressure monitoring device 10 has a gauge portion 12 and a valve stem portion 14. The valve stem portion 14 is essentially identical to the conventional valve stems used with tubeless tires. The stem portion 14 includes a cylindrical tube 16 which has a base 18 at one end and a bleeder valve 20 at the other. The base 18 is in the shape of two frustoconical portions connected at their wider ends. The base 18 has a medial groove 22 which is designed to receive the portion of the wheel rim 26 in the periphery of the opening 28. The device 10 can be installed by pressing base 18 into the opening 28. The material of the base 18 is a rubber or plastic which is sufficiently resilient to allow the frustoconical portion of base 18, distal from tube 16, to pass through opening 28, and for the rim of the opening 28 to snap into groove 22. The base 18 seals the interior of the tire from the atmosphere, thus making the passage 24 the only passage in fluid communication with the interior of the tire. Passage 24 is centrally located within base 18 and connects the interior of the tire with the hollow bore 30 of the tube 16. The tire is mounted on wheel 26 forming an enclosed space in cooperation with wheel 26. Because the tire and wheel arrangement is conventional, it has not been shown in the drawings.

The bleeder valve 20 is identical to the bleeder valves used on conventional valve stems. Bleeder valve 20 includes a valve housing 32 and an insert 34. The insert 34 is screwed into housing 32, with the washer 36 providing a seal between insert 34 and housing 32. Insert 34 has a central passage that is normally sealed by stopper 38. Plunger 40, when pressed in, moves the stopper 38 away from the entrance to the central passage of the insert 34, thus allowing air flow into and out of the tire. The familiar service station air hoses used for inflating tires have nozzles that have a centrally located pin. The pin engages the plunger 40 to open the valve 20 when the nozzle is pressed onto the valve stem, thus allowing air to be pumped into the tire.

Attached to tube 16, and positioned alongside thereof, is a pressure gauge housing 42. The housing 42 houses a tube 44 which is preferably made of steel but can also be made of other suitable materials. An opening 46 at the end of tube 44 communicates with the bore 30. A ball 48, having a diameter substantially equal to the diameter of tube 44, is provided within tube 44. The ball 48 has an 0-ring groove 50, and an 0-ring 52 seals any gap between ball 48 and the lumen of tube 44. It should be apparent to those skilled in the art that when valve 20 is closed the air pressure in the tire, the bore 30, and the portion of tube 44 extending between ball 48 and opening 46 will all be equal, since the tire, the bore 30, and the portion of tube 44 extending between ball 48 and opening 46 form a single contiguous, enclosed air space. Spring 54 provides resistance to the force exerted on the ball 48 due to the air pressure in the tire.

The end of the tube 44 on the spring side of ball 48 may or may not be open to the atmosphere. When the spring side of ball 48 is open to the atmosphere, the ball 48 will come to rest in a position at which the force exerted on the ball by spring 54 approximately equals the force exerted on the ball due to the air pressure in the tire, the weight of the ball being negligibly small. When the spring side of ball 48 is sealed off from the atmosphere, the air trapped on the spring side of ball 48 will act as a pneumatic spring supplementing the action of spring 54. In either case the position of ball 48 within tube 44 will vary as a function of the pressure in the tire.

Transparent window 56 allows the position of the ball 48, within tube 44, to be visualized by a user. The gauge 12 can be calibrated to determine the numerical value of tire pressure corresponding to various positions of ball 48. Indicia 58 can then be provided in proximity to window 56 in order to allow the approximate numerical value of the tire pressure to be determined by inspection. A magnifying lens 60 can optionally be provided to allow easier visualization of the position of ball 48 and the indicia 58. The indicia 58 can be provided on the transparent window 56, the lens 60, or the housing 42.

Referring to FIG. 3 the embodiment 10' is intended as a cap that can fit a standard valve stem rather than a complete replacement for one. The only difference between the embodiment of FIG. 3 and that of FIGS. 1 and 2 is that the base 18 is replaced with a threaded opening 18'. The threaded opening 18' has female threads which are matingly engageable with the bleeder valve 20' of a standard valve stem. As was noted previously, valves 20 and 20' are essentially identical, and valve 20' also has an insert similar to insert 34. In use, the insert of valve 20' would be removed and the device 10' screwed onto the valve 20'. The valve 20 would then be the primary valve controlling the filling of or the bleeding of air from the tire.

Referring to FIGS. 4, 5, and 6 a third embodiment of the present invention is seen. The embodiment of FIGS. 4, 5, and 6 is similar to the embodiment of FIG. 3, except that the gauge 12 is separate from, rather than being integral with the tube 16. The tube 16 has a lateral opening 62 which is threaded to receive a hose or conduit 64. The hose 64 connects the tube 16 to the threaded end 66 of gauge 12, thus allowing fluid communication between tube 16 and the interior of gauge 12. The threaded end 66 has a central opening communicating with the interior of gauge 12 which contains ball 48. hose 64 has threaded connectors 68 which are used to fix respective ends of hose 64 to openings 62 and 66. The gauge 12 can be fixed to the rim of wheel 26 by clip 70. Clip 70 is of the same type as is commonly used to fix wheel weights to automobile wheels. Alternatively, a magnet or any other suitable means may be used to fix gauge 12 to the rim of wheel 26. The embodiment of FIGS. 4, 5, and 6 is applied to standard valve stems in the same manner as described in reference to the embodiment of FIG. 3. In FIG. 4 an aerosol tire inflator 74 is shown to illustrate how the embodiment of FIGS. 4, 5, and 6 is used to allow inflation of the tire 72.

Referring to FIG. 7B, an alternative to the ball 48 is shown. The piston 48' has an O-ring groove 50' and generally functions in the same manner as ball 48. The elongated body of piston 48' allows the spring 54 to better prevent the piston 48' from tilting within the lumen of tube 44. The piston 48' can replace ball 48 in all the previously discussed embodiments.

It should be noted that the previously discussed embodiments of the present invention can function without spring 54 when the lumen of tube 44 is sealed from the atmosphere. In this case the air trapped between ball 48 and the closed end of tube 44 acts as a pneumatic spring, counterbalancing the force exerted on ball 48 due to the air pressure within the tire.

Figure 8:
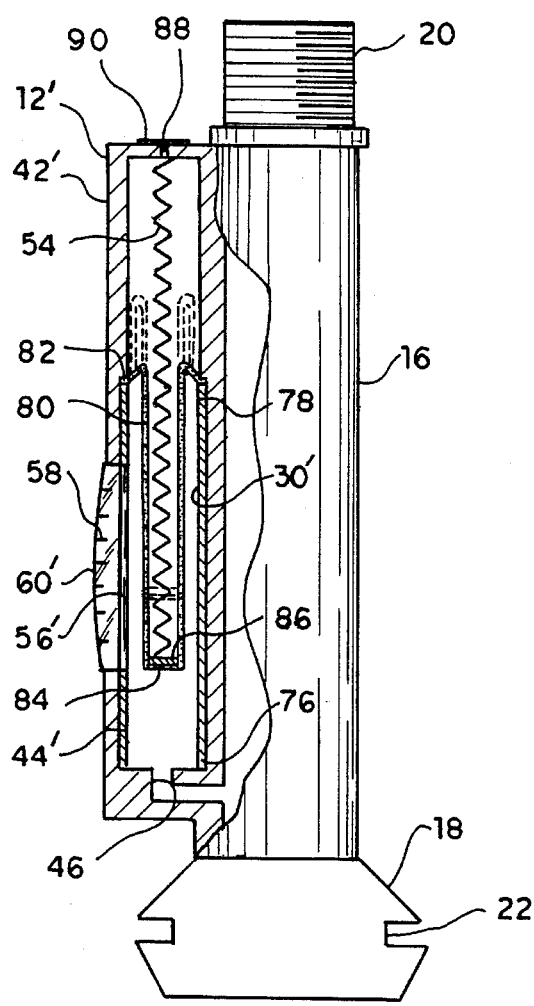
FIG. 8 is a partial cross sectional view showing the valve stem with integral pressure gauge of the present invention using a pressure gauge having a diaphragm.

Referring to FIG. 8, still another embodiment of the present invention is seen. The embodiment of FIG. 8 is identical to that of FIG. 1 except that a different type of pressure gauge 12' is used in place of pressure gauge 12 of FIG. 1. Attached to tube 16, and positioned alongside thereof, is a pressure gauge housing 42'. The housing 42' houses a tube 44' which is preferably made of steel but can also be made of other suitable materials. An opening 46 at the first end 76 of tube 44' communicates with the bore 30'. The second end 78 of tube 44' is also open, and the rim of an elastomeric diaphragm 80 is sealingly sandwiched between the end 78 and a shoulder 82 formed on the interior surface of housing 42'. The diaphragm 80 has a flat central portion 84 which is supported by a rigid disc 86. The diaphragm 80 effectively partitions the interior of gauge 12' into two parts. It should be apparent to those skilled in the art that when valve 20 is closed the air pressure in the tire, the bore of tube 16, and the portion of tube 44' between diaphragm 80 and opening 46 will all be equal. Spring 54 provides resistance to the force exerted on the diaphragm 80 due to the air pressure in the tire.

An opening 88 vents the spring side of diaphragm 80 to the atmosphere. Mesh type protective cover 90 helps to keep debris out of opening 88. The position of the flat portion 84 of diaphragm 80 within tube 44' will vary as a function of the pressure in the tire.

Transparent window 56' allows the position of the flat portion 84, within tube 44', to be visualized by a user. The gauge 12' can be calibrated to determine the numerical value of tire pressure corresponding to various positions of flat portion 84. Indicia 58 can then be provided in proximity to window 56' in order to allow the approximate numerical value of the tire pressure to be determined by inspection. A magnifying lens 60' can optionally be provided to allow easier visualization of the position of flat portion 84 and the indicia 58. The indicia 58 can be provided on the transparent window 56', the lens 60', or the housing 42'. In addition to being used integrally with a valve stem, the pressure gauge 12' can be made integral with an attachment to a standard valve stem, in the manner of the embodiment of FIG. 3, or connected via a hose to an attachment to a standard valve stem, in the manner of the embodiment of FIGS. 4, 5, and 6.

Figure 9:
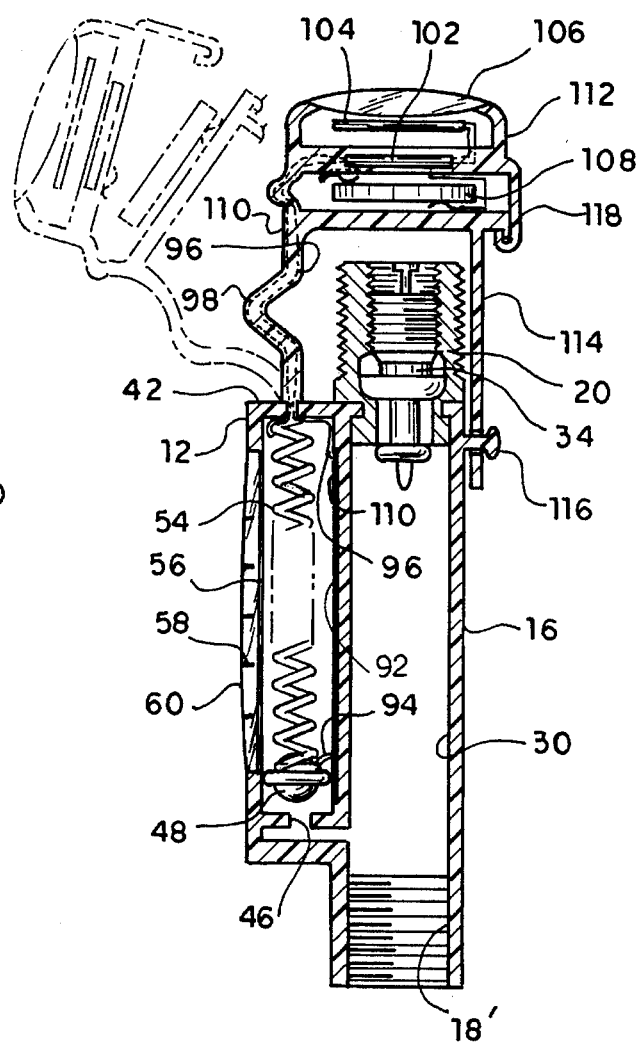
FIG. 9 is a cross sectional view showing the valve stem attachment with integral pressure gauge of the present invention incorporating an electronic tire pressure display.

Referring to FIG. 9, yet another embodiment of the present invention is seen. In this embodiment, an electronic display of the tire pressure is provided in addition to the mechanical display provided by ball 48. The embodiment of FIG. 9 is essentially identical to that of FIG. 3, with exception of the differences noted below. The embodiment of FIG. 9 includes a transducer means for transducing the pressure of the air within the tire into a measurable electrical quantity. This transducer means can be any known means including, but not limited to, a variable resistor, a thin film pressure transducer, a piezoelectric pressure transducer, and a strain gauge mounted on tube 16. In the example shown in FIG. 9, a variable resistor is used. A resistive strip 92 is provided on the interior surface of the gauge 12. A conductive brush 94 connects spring 54 to resistive strip 92. Spring 54 is preferably made of steel and is itself conductive. Wire lead 96 connects the first end 100 of resistive strip 92 to integrated circuit chip 102. Wire lead 98 connects the spring 54 to integrated circuit chip 102.

The resistance measured between brush 94 and lead 96 will be the resistance of that portion of the resistive strip 92 which extends between end 100 and brush 94. The resistance of this portion of the resistive strip 92 is proportional to the length of the portion of resistive strip 92 extending between end 100 and brush 94, which length varies with the position of ball 48. Therefore, the resistance measured between brush 94 and lead 96 will be a function of the tire pressure. Integrated circuit chip 102 includes a bridge circuit that can be used to measure the resistance of the portion of resistive strip 92 extending between end 100 and brush 94. Further, integrated circuit 102 can be programmed to output a digital signal representative of the tire pressure based on the resistance measured between lead 96 and brush 94. Such integrated circuits are well known in the art and will not be discussed in detail here.

The output of Integrated circuit 102 is fed to digital display 104 which displays the numerical value of the tire pressure. Display 104 can be of any known type including, but not limited to, LCD and LED displays. Optional magnifying lens 106 enhances the visibility of display 104. Battery 108 provides the necessary power to run all the electronics associated with the electronic pressure transducing system of FIG. 9.

Cap 110 acts as a protective closure for valve 20 and supports a second cap 112, battery 108, integrated circuit 102, and display 104. Cap 110 is resiliently attached to housing 42 and can be opened by removing tab 114 from male snap fastener 116 to allow access to valve 20. Second cap 112 is resiliently attached to cap 110 and can be opened by removing tab 118 from hook 120 to allow access to battery 108 for the purposes of installing the battery or replacing it.

Although the use of an electronic pressure display with only one embodiment of the present invention has been presented in detail, it is to be understood that an electronic display can be used with all the embodiments described above and that all such combinations are contemplated as being within the scope of the present invention.

Figure 10:
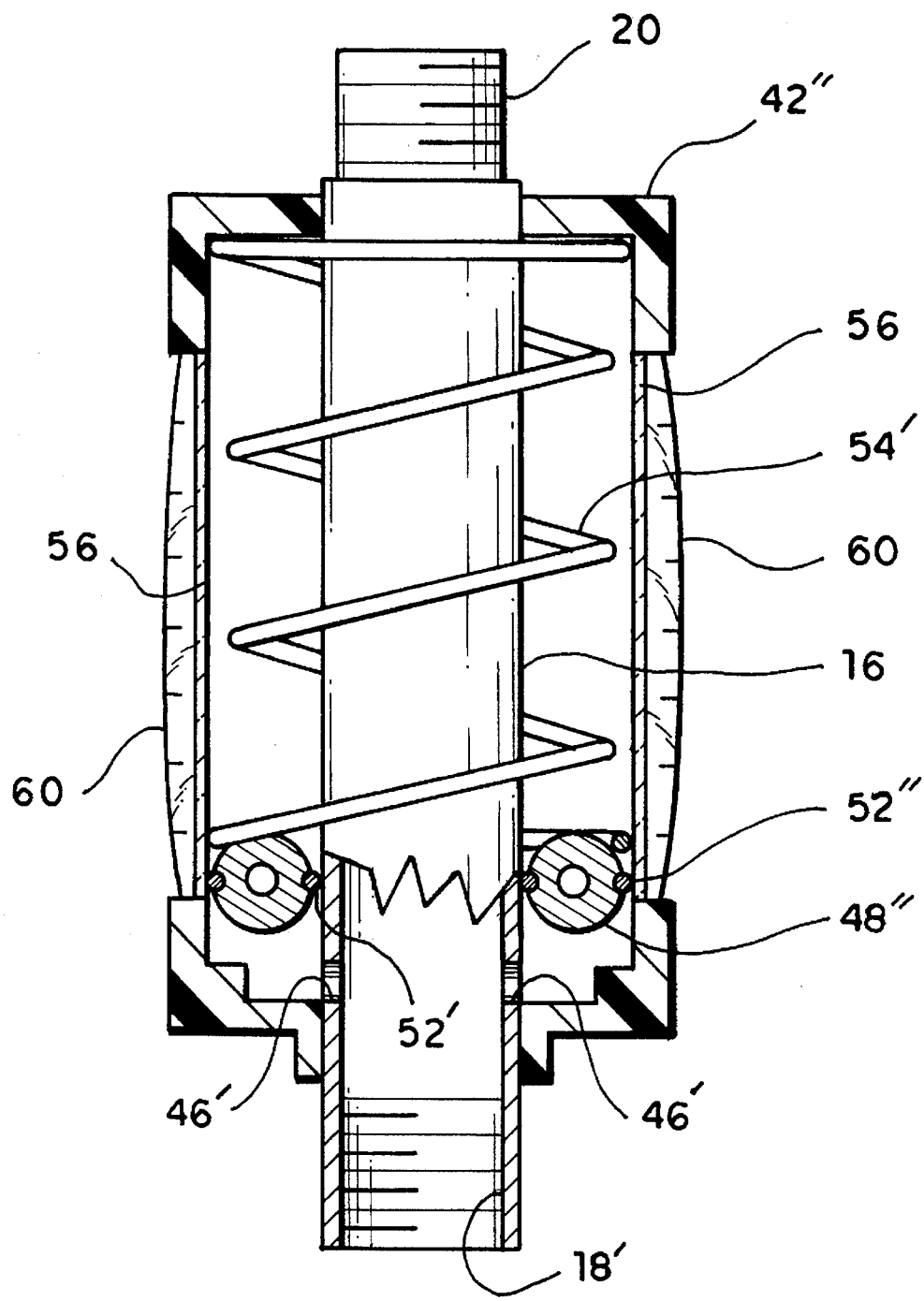
FIG. 10 is a partial cross sectional view showing the valve stem attachment with integral pressure gauge of the present invention using a pressure gauge tube which is concentric with the air tube allowing fluid communication between the valve stem and the bleeder valve.

Referring to FIG. 10 yet another embodiment of the present invention is seen. The embodiment of FIG. 10 is essentially identical to that of FIG. 3 except as noted below. Instead of the pressure gauge housing 42 being positioned alongside tube 16, in the embodiment of FIG. 10 the housing 42" is a tube concentric with the tube 16. In the simplified embodiment shown in FIG. 10 the steel tube or liner 44 has been eliminated, however such a liner may optionally be provided if desired. Making the housing 42" concentric with the tube 16 necessitates the replacement of ball 48 with a toroidal piston 48" which substantially fills the annular gap between the outside surface of tube 16 and the inside surface of housing 42". The use of a toroidal piston necessitates the use of an inner O-ring 52' and an outer O-ring 52". A respective O-ring groove is provided in the toroidal piston 48" for each of the inner and outer O-rings 52' and 52". Because the pressure indicating member 48" is toroidal, a transparent window provided anywhere in the outer wall of the tube 42" will allow the visualization of the pressure indicating member. Therefore any number of transparent windows 56 may be provided in the wall of tube 42", or the wall of tube 42" may be made transparent all around. As before, transparent windows 56' are provided with magnifying lenses 60. In addition, a plurality of openings 46' can be provided instead of the single opening 46 of the embodiment of FIG. 3. Also the spring 54 of the embodiment of FIG. 3 is replaced with a larger diameter spring 54' which fits in the annular space between the outside surface of tube 16 and the inside surface of housing 42".

It should be noted that any of the previously discussed embodiments, which have a gauge integral with a valve stem or a valve stem attachment, may be made with the tube containing the pressure indicating member being concentric with the tube allowing fluid communication between the tire interior and the bleeder valve, and that all such variations are contemplated as being within the scope of the present invention.

It is to be understood that the present invention is not limited to the embodiments described above, but encompasses any and all embodiments within the scope of the following claims.

I claim:

1. A tire pressure monitoring device for use with a pneumatic wheel assembly mounted to a vehicle, the wheel assembly including a wheel supporting a tire, the tire having an interior filled with air and the air having a pressure, said tire pressure monitoring device comprising:

a hollow tube having a lumen, a wall, a first end, and a second end, said second end having an opening allowing fluid communication between said lumen and the interior of the tire;

an indicator member disposed within said tube, at least a portion of said indicator member being movable along said lumen;

attachment means for allowing said tire pressure monitoring device to remain attached to the wheel assembly while the vehicle is in operation; and a transparent window provided in said wall and extending along a portion of said tube, said at least a portion of said indicator member assuming a position along said transparent window responsive to the pressure of the air within the tire, said transparent window allowing the position of said at least a portion of said indicator member within said tube to be visualized, whereby the position of said at least a portion of said indicator member within said tube is indicative of the pressure of the air within the tire when said opening in said second end is in communication with the interior of the tire.

2. The tire pressure monitoring device according to claim 1, wherein said tube is cylindrical and has a first diameter, and said indicator member is a ball having a diameter substantially equal to said first diameter.

3. The tire pressure monitoring device according to claim 2, further including:

a coil spring disposed within said tube intermediate said ball and said first end, whereby movement of said ball within said tube is resisted at least in part by a change in length of said coil spring.

4. The tire pressure monitoring device according to claim 3, wherein said ball has an O-ring groove, and an O-ring is provided intermediate said O-ring groove and said wall of said tube, whereby said O-ring partitions said lumen of said tube into a first portion extending between said O-ring and said first end, and a second portion extending between said O-ring and said second end, and said O-ring sealingly isolates said second portion from said first portion.

5. The tire pressure monitoring device according to claim 4, wherein indicia are provided proximate said transparent window, whereby the position of said ball along said tube is readily correlated with an approximate magnitude of the pressure of the air within the tire when said opening in said second end is in communication with the tire.

6. The tire pressure monitoring device according to claim 2, wherein said attachment means is a valve stem, said tube is fixed alongside said valve stem, said valve stem has a hollow interior, and said opening at said second end is in communication with said hollow interior of said valve stem.

7. The tire pressure monitoring device according to claim 2, wherein said attachment means includes:

a cap having a first end, a second end, and a hollow bore extending between said first end of said cap and said second end of said cap, said second end of said cap having an opening provided with female screw threads, said female screw threads being engageable with a valve stem in communication with the interior of the tire, said tube being fixed alongside said cap, and said opening at said second end of said tube being in communication with said hollow bore; and a bleeder valve provided at said first end of said cap.

8. The tire pressure monitoring device according to claim 2, wherein said attachment means is engageable with a rim of the wheel supporting the tire, said tire pressure monitoring device further including:

a connector having a first end, a second end, a hollow bore extending between said first end of said connector and said second end of said connector, and a lateral opening intermediate said first end of said connector and said second end of said connector, said lateral opening being in communication with said hollow bore, said second end of said connector having an opening provided with female screw threads, said female screw threads being engageable with a valve stem in communication with the interior of the tire, and said first end of said connector having a bleeder valve attached thereto; and a conduit extending between said second end of said tube and said lateral opening, said conduit providing communication between said hollow bore and said opening in said second end of said tube.

9. The tire pressure monitoring device according to claim 1, wherein said tube is cylindrical and has a first diameter, said indicator member is a piston having a diameter substantially equal to said first diameter, and said piston having an O-ring groove, said tire pressure monitoring device further including:

an O-ring provided intermediate said O-ring groove and said wall of said tube; and a coil spring disposed within said tube intermediate said piston and said first end.

10. The tire pressure monitoring device according to claim 9, wherein indicia are provided proximate said transparent window, whereby the position of said piston along said tube is readily correlated with an approximate magnitude of the pressure of the air within the tire when said opening in said second end is in communication with the tire.

11. The tire pressure monitoring device according to claim 9, wherein said attachment means is a valve stem, said tube is fixed alongside said valve stem, said valve stem has a hollow interior, and said opening at said second end is in communication with said hollow interior of said valve stem.

12. The tire pressure monitoring device according to claim 9, wherein said attachment means includes:

a cap having a first end, a second end, and a hollow bore extending between said first end of said cap and said second end of said cap, said second end of said cap having an opening provided with female screw threads, said female screw threads being engageable with a valve stem in communication with the interior of the tire, said tube being fixed alongside said cap, and said opening at said second end of said tube being in communication with said hollow bore; and a bleeder valve provided at said first end of said cap.

13. The tire pressure monitoring device according to claim 9, wherein said attachment means is engageable with a rim of the wheel supporting the tire, said tire pressure monitoring device further including:

a connector having a first end, a second end, a hollow bore extending between said first end of said connector and said second end of said connector, and a lateral opening intermediate said first end of said connector and said second end of said connector, said lateral opening being in communication with said hollow bore, said second end of said connector having an opening provided with female screw threads, said female screw threads being engageable with a valve stem in communication with the interior of the tire, and said first end of said connector having a bleeder valve attached thereto; and a conduit extending between said second end of said tube and said lateral opening, said conduit providing communication between said hollow bore and said opening in said second end of said tube.

14. The tire pressure monitoring device according to claim 1, wherein said indicator member is a diaphragm having a flat portion, said flat portion being movable along said lumen responsive to the pressure of the air within the tire, said tire pressure monitoring device further including:

a coil spring disposed within said tube intermediate said flat portion and said first end.

15. The tire pressure monitoring device according to claim 14, wherein said attachment means is a valve stem, said tube is fixed alongside said valve stem, said valve stem has a hollow interior, and said opening at said second end is in communication with said hollow interior of said valve stem.

16. The tire pressure monitoring device according to claim 14, wherein said attachment means includes:

a cap having a first end, a second end, and a hollow bore extending between said first end of said cap and said second end of said cap, said second end of said cap having an opening provided with female screw threads, said female screw threads being engageable with a valve stem in communication with the interior of the tire, said tube being fixed alongside said cap, and said opening at said second end of said tube being in communication with said hollow bore; and a bleeder valve provided at said first end of said cap.

17. The tire pressure monitoring device according to claim 14, wherein said attachment means is engageable with a rim of the wheel supporting the tire, said tire pressure monitoring device further including:

a connector having a first end, a second end, a hollow bore extending between said first end of said connector and said second end of said connector, and a lateral opening intermediate said first end of said connector and said second end of said connector, said lateral opening being in communication with said hollow bore, said second end of said connector having an opening provided with female screw threads, said female screw threads being engageable with a valve stem in communication with the interior of the tire, and said first end of said connector having a bleeder valve attached thereto; and a conduit extending between said second end of said tube and said lateral opening, said conduit providing communication between said hollow bore and said opening in said second end of said tube.

18. The tire pressure monitoring device according to claim 1, further including:

transducer means for transducing the pressure of the air within the tire into a measurable electrical quantity;

a circuit connected to said transducer means, said circuit measuring said electrical quantity and producing an output signal representative of the pressure of the air within the tire; and a display for displaying said output signal in human-readable form.

19. The tire pressure monitoring device according to claim 18, wherein said transducer means is a variable resistor having a resistance which varies in response to said position of said at least a portion of said indicator member along said transparent window.

20. The tire pressure monitoring device according to claim 1, wherein said tube is cylindrical and said attachment means includes:

a cylindrical conduit having a first end, a second end, and a hollow bore extending between said first end of said cylindrical conduit and said second end of said cylindrical conduit, said hollow bore being in fluid communication with said opening at said second end of said tube, said cylindrical conduit being concentric with said tube; and a bleeder valve provided at said first end of said cylindrical conduit.

* * * * *